Nov. 4, 1930.                J. C. PEWTHER                 1,780,839
                                 WASHER
                         Filed March 30, 1929

Witness
H. Woodard

Inventor
Judson C. Pewther
By
Attorneys

Patented Nov. 4, 1930

1,780,839

UNITED STATES PATENT OFFICE

JUDSON C. PEWTHER, OF WICHITA, KANSAS

WASHER

Application filed March 30, 1929. Serial No. 351,389.

This invention relates particularly to metal washers which are slotted at one side to permit slipping them astride the intermediate portion of a round body, such as a bolt or rod, when it is not convenient or practical to place said rod or bolt through a hole in the washer as is usual.

More particularly, the principal object of my invention is to provide means whereby a slotted washer can be readily attached to a bolt or other round body after it has been slipped astride thereof, to prevent accidental displacement and loss.

A further object of my invention is to provide a washer which is a single unit, yet is so constructed that it contracts around and encloses a round object when placed astride thereof and driven into final position, thus becoming permanently attached thereto.

A further object of my invention is to provide a washer of this class which may be installed and closed without the use of special tools other than an ordinary hammer.

Another object of my invention is to provide a washer of this class which will close when driven against wood or other comparatively soft substance without cutting in and becoming clogged and thereby hindered from closing, and without weakening the object against which it is driven.

A more specific aim of my invention is to provide a wedge-shaped washer, such as is commonly used to correct the angular relation between the axle of an automobile and the rest of the car, which can be driven between the axle and the spring and permanently secured, without the necessity of jacking up the spring and slipping the spring bolt through a hole in the washer as is now customary.

These and other objects I attain by the construction shown in the accompanying drawing, wherein for purposes of illustration two embodiments of my invention are shown.

Figure 1:
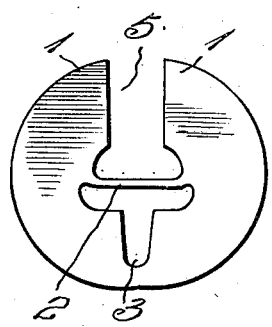
Fig. 1 is a plan view of a round washer constructed in accordance with my invention, showing the relation of the parts when the washer is open.
Figure 2:
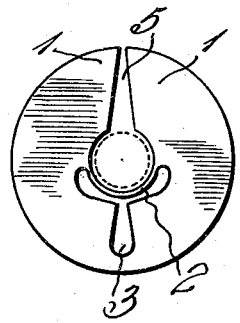
Fig. 2 is a view similar to Fig. 1 but showing the washer closed as it would be when driven against a round object as indicated by the dotted line.
Figure 3:
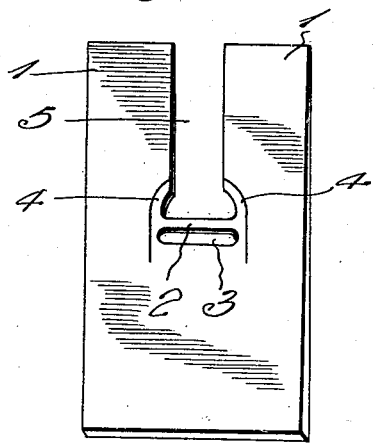
Fig. 3 is a perspective view of a wedge-shaped washer such as is used between the spring and the axle of an automobile.
Figure 4:
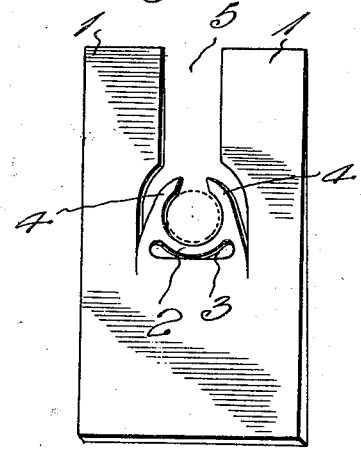
Fig. 4 is a view similar to Fig. 3 but showing the washer as it would appear after being driven between the spring and the axle of an automobile with the slot astride the spring bolt head, the position of the bolt head being indicated by the dotted line at the end of the slot.

Referring now more particularly to the drawings where like numerals indicate like parts; 1 is the body of the washer; 5 is the slot which is cut out to permit slipping the washer astride a round object on which it is to be placed; 3 is an aperture which in effect is a continuation of slot 5, except that it is divided from slot 5 by bar 2, which is normally straight although bar 2 is bent when the washer is placed astride a round object and driven onto it. The bending of bar 2 draws inward upon the walls of slot 5 with the result indicated in Figs. 2 and 4. The bending of bar 2, where the structure is like that indicated in Figs. 3 and 4, draws arms 4 inward to close around the object, said arms 4 normally forming portions of the walls of slot 5.

It is obvious that this invention has a wide range of use and that minor changes can be made without departing from the spirit of said invention. Therefore, I do not wish to limit myself except as is set forth in the following claims.

I claim:

1. A bendable metal washer having a slot opening through one edge and an aperture inwardly spaced from the inner end of said slot, and means located between said slot and said aperture for drawing the walls of the slot toward each other when said means is driven against an object straddled by the washer.

2. A bendable metal washer having a slot opening through one edge and an aperture inwardly spaced from the inner end of said slot, and an integral bendable bar located between said slot and said aperture for drawing the walls of the slot toward each other when said bar is driven against an object straddled by the washer.

3. A structure as specified in claim 2; the portions of the slot walls at the ends of said bar being partly cut from the remainder of the washer to provide arms to embrace the object straddled by the washer, the free ends of said arms being disposed toward the open end of the slot.

JUDSON C. PEWTHER.